(12) United States Patent
Sawtell et al.

(10) Patent No.: US 8,869,900 B2
(45) Date of Patent: Oct. 28, 2014

(54) METHOD AND APPARATUS FOR CONNECTING DRILLING RISER STRINGS AND COMPOSITIONS THEREOF

(75) Inventors: Ralph Sawtell, Gibsonia, PA (US); Matthew P. Kiley, Allison Park, PA (US); Harry R. Zonker, Pittsburgh, PA (US); James T. Burg, Verona, PA (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 300 days.

(21) Appl. No.: 12/111,001

(22) Filed: Apr. 28, 2008

(65) Prior Publication Data

US 2008/0264644 A1 Oct. 30, 2008

Related U.S. Application Data

(60) Provisional application No. 60/914,631, filed on Apr. 27, 2007.

(51) Int. Cl.
*E21B 7/12* (2006.01)
*E21B 17/01* (2006.01)
*E21B 17/02* (2006.01)

(52) U.S. Cl.
CPC *E21B 17/01* (2013.01); *E21B 17/02* (2013.01)
USPC .............................. 166/345; 166/367; 166/350

(58) Field of Classification Search
CPC ................................. E21B 17/01; E21B 17/02
USPC ............ 166/345, 350, 359, 367, 344; 285/18, 285/31, 115, 329, 330, 333, 355, 376, 401, 285/377
See application file for complete search history.

(56) References Cited

U.S. PATENT DOCUMENTS

| | | | | |
|---|---|---|---|---|
| 1,756,597 A | * | 4/1930 | Keenan | 285/123.14 |
| 1,817,808 A | | 4/1931 | Eaton | |
| 1,819,036 A | * | 8/1931 | Oberhuber | 285/363 |
| 1,889,873 A | * | 12/1932 | Montgomery | 285/333 |

(Continued)

FOREIGN PATENT DOCUMENTS

| | | |
|---|---|---|
| BE | 351 943 | 7/1928 |
| DE | 2 242 928 | 3/1974 |

(Continued)

OTHER PUBLICATIONS

International Search Report for PCT/US2008/061801 dated Aug. 14, 2008.

(Continued)

*Primary Examiner* — David Bagnell
*Assistant Examiner* — Aaron Lembo
(74) *Attorney, Agent, or Firm* — Greenberg Traurig, LLP

(57) ABSTRACT

In one embodiment, the present invention relates to a riser apparatus for use in offshore drilling for oil or other fossil fuels, the riser apparatus comprising: a plurality of riser sections coupled serially end-to-end, wherein each of the riser sections comprises: a tube having a first end and a second end; a first flanged that is mechanically joined to the first end of the tube; a second flanged that is mechanically joined to the second end of the tube; wherein the tube is constructed of an aluminum alloy; and wherein the flanges are constructed of the aluminum alloy; and wherein the riser apparatus has a length of approximately 1,500 meters or greater.

19 Claims, 16 Drawing Sheets

(56) References Cited

U.S. PATENT DOCUMENTS

| | | | | |
|---|---|---|---|---|
| 2,128,111 | A * | 8/1938 | Woods et al. | 285/45 |
| 2,837,354 | A * | 6/1958 | Thibault et al. | 285/222.4 |
| 2,950,132 | A | 8/1960 | Kocsuta | |
| 3,326,581 | A * | 6/1967 | Wong | 285/148.11 |
| 3,501,173 | A * | 3/1970 | Linder et al. | 285/114 |
| 3,630,551 | A | 12/1971 | Brown | |
| 3,651,661 | A * | 3/1972 | Darrow | 464/181 |
| 3,659,877 | A * | 5/1972 | Kubasta | 285/3 |
| 3,717,002 | A * | 2/1973 | O'Brien et al. | 405/170 |
| 3,768,842 | A * | 10/1973 | Ahlstone | 285/55 |
| 3,827,728 | A * | 8/1974 | Hynes | 285/90 |
| 3,836,183 | A * | 9/1974 | Battle | 285/363 |
| 3,848,421 | A * | 11/1974 | O'Brien et al. | 405/170 |
| 4,043,575 | A * | 8/1977 | Roth | 285/90 |
| 4,068,865 | A * | 1/1978 | Shanks, II | 285/90 |
| 4,103,748 | A * | 8/1978 | Arnold | 175/61 |
| 4,120,520 | A * | 10/1978 | Ahlstone | 285/18 |
| 4,124,229 | A * | 11/1978 | Ahlstone | 285/18 |
| 4,139,221 | A * | 2/1979 | Shotbolt | 285/18 |
| 4,183,562 | A * | 1/1980 | Watkins et al. | 285/405 |
| 4,222,590 | A * | 9/1980 | Regan | 285/14 |
| 4,280,719 | A * | 7/1981 | Daniel et al. | 285/90 |
| 4,330,140 | A * | 5/1982 | Hampton | 285/39 |
| 4,332,073 | A | 6/1982 | Yoshida et al. | |
| 4,335,904 | A * | 6/1982 | Saliger et al. | 285/18 |
| 4,374,595 | A * | 2/1983 | Watkins | 285/123.2 |
| 4,428,603 | A * | 1/1984 | Davlin | 285/368 |
| 4,470,621 | A * | 9/1984 | Irvine | 285/114 |
| 4,496,173 | A * | 1/1985 | Roche et al. | 285/24 |
| 4,534,585 | A * | 8/1985 | Saliger | 285/92 |
| 4,550,936 | A * | 11/1985 | Haeber et al. | 285/26 |
| 4,557,508 | A * | 12/1985 | Walker | 285/84 |
| 4,573,714 | A * | 3/1986 | Sweeney | 285/363 |
| 4,634,314 | A * | 1/1987 | Pierce | 405/224.2 |
| 4,653,778 | A * | 3/1987 | Alandy | 285/18 |
| 4,703,954 | A | 11/1987 | Ortloff et al. | |
| 4,708,513 | A * | 11/1987 | Roche et al. | 403/361 |
| 4,717,183 | A * | 1/1988 | Nobileau | 285/334 |
| 4,768,275 | A * | 9/1988 | Schmitz | 29/407.01 |
| 4,776,618 | A | 10/1988 | Barree | |
| 4,821,804 | A * | 4/1989 | Pierce | 166/367 |
| 4,892,337 | A * | 1/1990 | Gunderson et al. | 285/333 |
| 4,896,904 | A * | 1/1990 | Gadsden et al. | 285/381.5 |
| 5,135,266 | A * | 8/1992 | Bridges et al. | 285/123.7 |
| 5,159,982 | A * | 11/1992 | Hynes | 166/345 |
| 5,316,320 | A * | 5/1994 | Breaker | 277/611 |
| 5,423,575 | A * | 6/1995 | Parks | 285/123.1 |
| 5,439,323 | A * | 8/1995 | Nance | 405/195.1 |
| 5,441,311 | A * | 8/1995 | Watkins | 285/18 |
| 5,605,194 | A * | 2/1997 | Smith | 166/382 |
| 5,634,671 | A * | 6/1997 | Watkins | 285/18 |
| 5,636,878 | A * | 6/1997 | Millward et al. | 285/55 |
| 5,813,467 | A * | 9/1998 | Anderson et al. | 166/367 |
| 5,992,893 | A * | 11/1999 | Watkins | 285/18 |
| 6,106,024 | A * | 8/2000 | Herman et al. | 285/18 |
| 6,355,318 | B1 | 3/2002 | Tailor et al. | |
| 6,361,080 | B1 * | 3/2002 | Walsh et al. | 285/55 |
| 6,405,762 | B1 * | 6/2002 | Bunch | 138/109 |
| 6,415,867 | B1 * | 7/2002 | Deul et al. | 166/367 |
| 6,494,499 | B1 * | 12/2002 | Galle et al. | 285/334 |
| 6,615,922 | B2 * | 9/2003 | Deul et al. | 166/367 |
| 6,692,041 | B1 * | 2/2004 | Coulas, Sr. | 285/406 |
| 6,929,287 | B2 * | 8/2005 | Flindall | 285/18 |
| 7,040,410 | B2 * | 5/2006 | McGuire et al. | 166/379 |
| 7,080,858 | B2 * | 7/2006 | Sanches et al. | 285/222.1 |
| 7,204,524 | B2 * | 4/2007 | Eccleston | 285/258 |
| 7,331,395 | B2 * | 2/2008 | Fraser et al. | 166/345 |
| 2003/0141718 | A1 * | 7/2003 | Bilderbeek | 285/348 |
| 2004/0074649 | A1 | 4/2004 | Hatton et al. | |
| 2005/0052026 | A1 | 3/2005 | Hayashi et al. | |
| 2005/0161941 | A1 | 7/2005 | Poll et al. | |
| 2005/0225089 | A1 | 10/2005 | Ben-Horin | |
| 2006/0017287 | A1 | 1/2006 | Milberger | |
| 2006/0188342 | A1 * | 8/2006 | Salama et al. | 405/224.2 |

FOREIGN PATENT DOCUMENTS

| | | |
|---|---|---|
| DE | 28 53 634 | 6/1980 |
| DE | 195 07 954 A1 | 9/1995 |
| EP | 0 084 877 | 8/1983 |
| EP | 1 519 001 | 3/2005 |
| GB | 190900124 | 0/1909 |
| GB | 259 891 | 10/1926 |
| GB | 913279 | 12/1962 |
| JP | 11-37345 | 2/1999 |
| JP | 11-344191 A2 | 12/1999 |
| RU | 2225560 C2 | 3/2004 |
| RU | 2246641 C2 | 2/2005 |
| WO | 2009/077735 | 6/2009 |

OTHER PUBLICATIONS

Written Opinion of Inter International Searching Authority for PCT/GB208/004128 dated Jun. 14, 2010 (8 pgs).

Roark, H. "Fixture for joining tubes by heat shrinking", Research Disclosure, Kenneth Mason Publications Ltd, vol. 290, No. 116, Jun. 1, 1988 (2 pgs).

Aluminum Drill Pipe: Engineering Data—Edition No. 9; 36 pgs Copyright (c) 1987 Reynolds International Inc.

"Implement Russian Aluminum Drill Pipe and Retractable Drilling Bits into the USA—vol. I: Development of Aluminum Drill Pipe in Russia—Final Report"; TR99-23, Aquatic Company and Maurer Engineering Inc., Aug. 1999.

Norsok Standard M-001, Rev. 4; Materials Selection; Aug. 2004.

Specification for Piping Fabrication and Installation, RSPPM Project, Offshore Design MR, Mumbai, vol N. III, Rev No. 2, Spec. No. 2004B; Oil and Natural Gas Corporation Ltd., India.

* cited by examiner

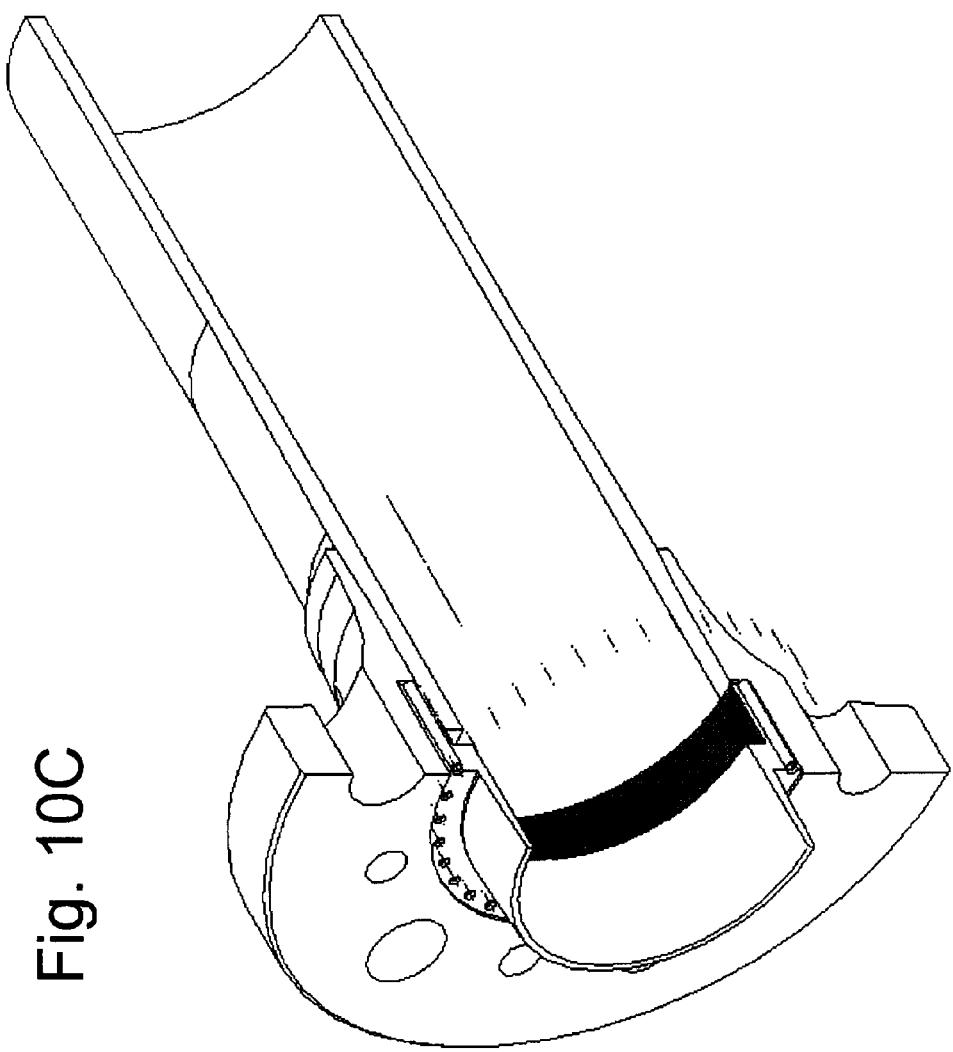

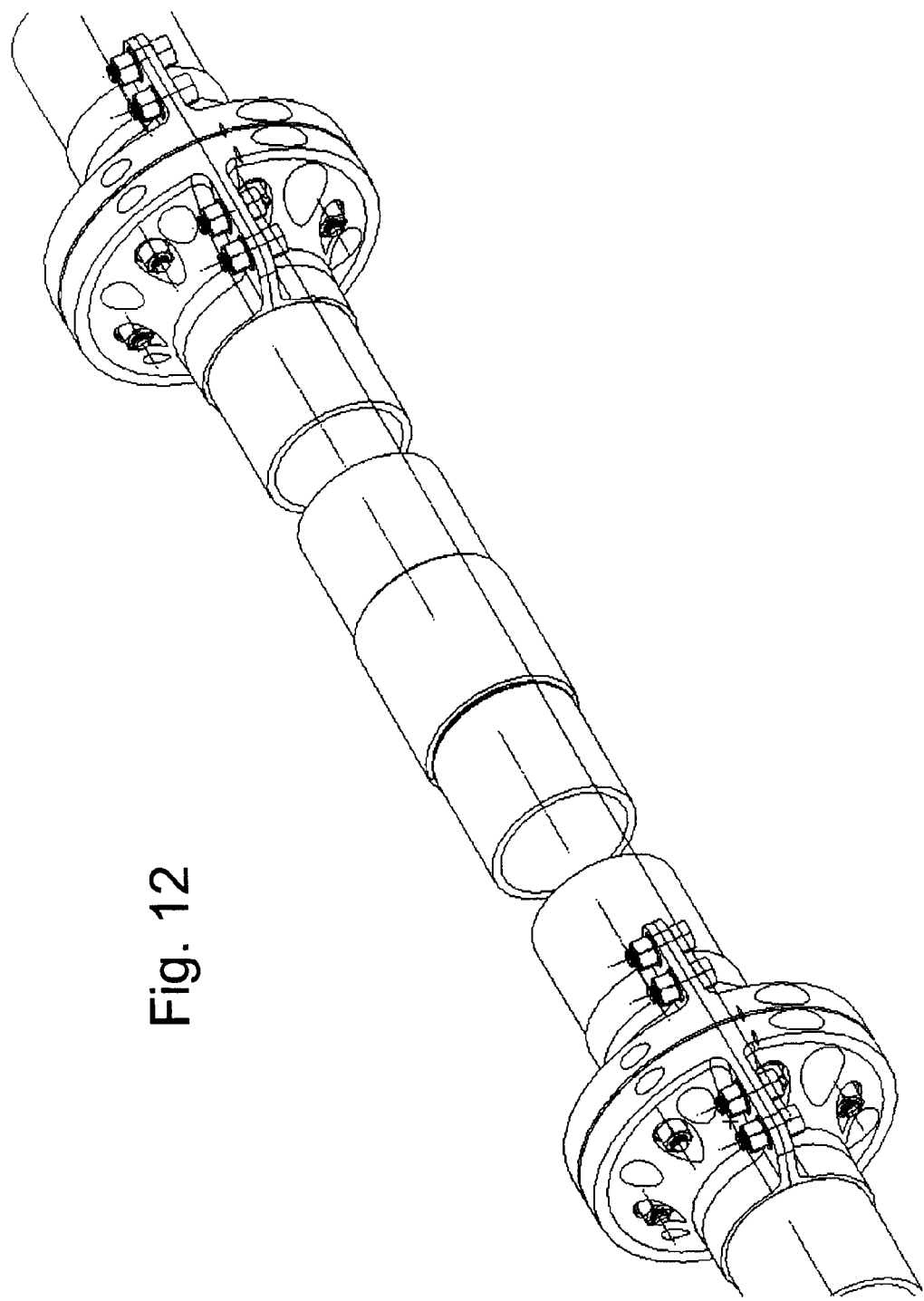

METHOD AND APPARATUS FOR CONNECTING DRILLING RISER STRINGS AND COMPOSITIONS THEREOF

BACKGROUND OF THE INVENTION

Offshore drilling rigs, such as fixed platforms, jack-up platforms, floating and/or semi-submersible platforms, and dynamically positioned drill ships, are used in the production of hydrocarbons from under the floor of large bodies of water. A riser string is typically provided between the floating rig and the wellhead at the ocean floor. A conventional marine riser comprises a cylindrical tube or column made of ferrous metal, e.g., steel, which is positioned vertically between the seabed and a drilling platform at the surface. The riser typically comprises a plurality of sections or joints connected end to end in a string between the surface and the wellbore. An increasing demand for drilling in greater depths of water has required additional riser tube to be used in order to span the distance from the ocean floor to the floating platform.

In one example, the conventional drilling riser concept comprises a main thick-wall tube that is 21-in. OD with welded connections on each end, usually flanges. The kill and choke, booster and hydraulic lines surround the main tube with connections in the flanges and are supported by clamps. Existing equipment allows the extrusion of 36-ft (11-m) tubes with up to 22.4-in. (570-mm) OD and 1.2-in (30-mm) to 1.4-in. (35-mm) wall thickness. Service lines are connected to the main tube using welded clamp bands. Clamps are needed to prevent the service lines from buckling, to block buoyancy module displacement and to provide support for corrosion protection units.

SUMMARY OF THE INVENTION

Accordingly, the present invention provides an improved riser for use in offshore drilling operations. In accordance with one embodiment of the present invention, a riser apparatus for use in offshore drilling comprises a plurality of riser sections coupled serially end-to-end, wherein each of the riser sections comprises a tube having a first end and a second end, a first flange mechanically joined to the first end of the tube, and a second flange coupling mechanically joined to the second end of the tube, wherein the tube is composed of variable wall thicknesses along the length.

In yet another embodiment, the present invention relates to a plurality of riser sections coupled serially end-to-end, wherein each of the riser sections comprises: a tube having a first end and a second end; a first flange that is mechanically joined to the first end of the tube; a second flange that is mechanically joined to the second end of the tube; wherein the tube is constructed of an aluminum alloy; and wherein the flanges are constructed of the aluminum alloy.

In another embodiment, the riser apparatus may optionally include one or more auxiliary lines providing hydraulic communication with a blowout preventer. The auxiliary lines may include without limitation choke and kill lines, hydraulic lines, and booster lines. In connection with the provision of auxiliary lines, telescoping joints may also be provided to allow for stretching of the riser with the movement of the floating rig due to factors such as ocean currents, waves, and the wind.

For a more complete understanding of the present invention, including its features and advantages, reference is now made to the following detailed description, taken in conjunction with the accompanying drawings.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIGS. 10 and 10A-10C are embodiments of the present invention illustrating a coupling of a SuperNut type connection;

FIGS. 12 and 12A is one embodiment of the present invention illustrating a coupling of a Split flange.

Corresponding numerals and symbols in the different figures refer to corresponding parts unless otherwise indicated.

DETAILED DESCRIPTION OF EMBODIMENTS OF THE INVENTION

Figure 1:
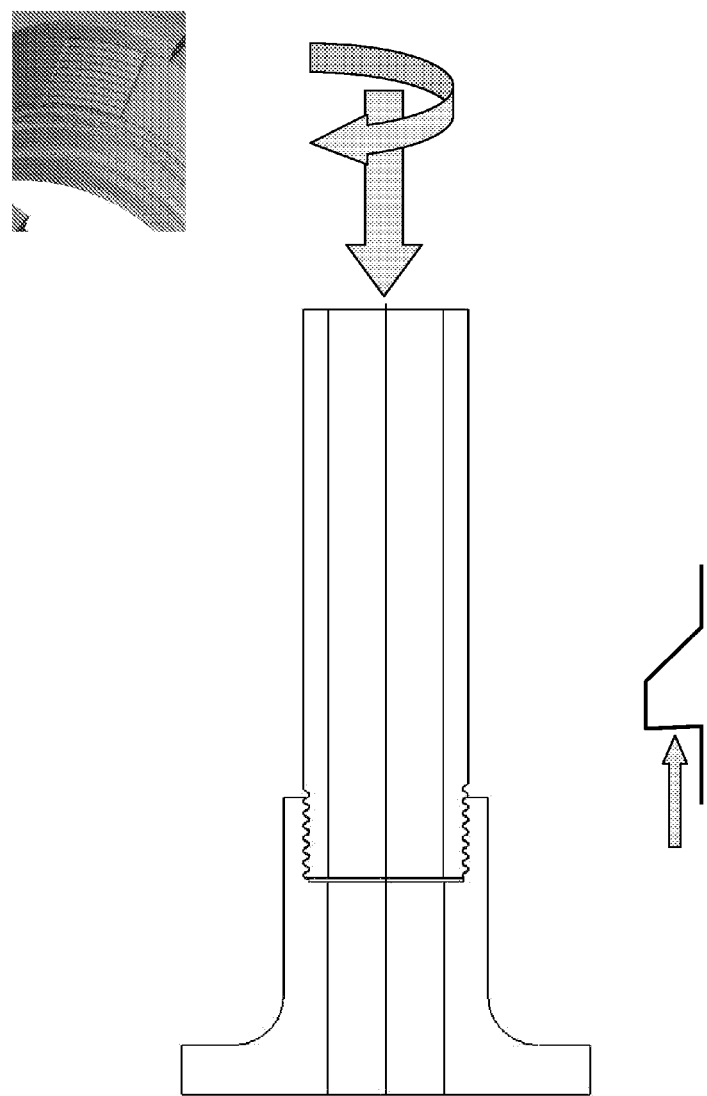
FIG. 1 is one embodiment of the present invention illustrating a coupling of a Taper/Buttress/Breach Thread.

Offshore drilling rig comprises a derrick carried by a platform. Platform floats in a body of water over a seabed with the support of one or more pontoons. Derrick functions primarily to drill a wellbore if deployed and to pump oil and other fossil fuels from a well.

A riser extends from platform to drilling equipment and a blowout preventer (BOP), which comprises a series of valves that can close to prevent any accidental blowouts. The primary functions of riser 24 are to guide drill tube and tools to the wellbore and to provide a return pathway for drilling mud which is circulated therein.

Riser comprises a plurality of elongated riser joints or riser sections coupled together. In one embodiment, each of the riser sections has a high strength-to-weight ratio, such that each riser section can resist the pressure of the materials enclosed within, as well as accommodate the deckload, and the load caused by the suspension of additional riser sections. In another embodiment, the riser sections are capable of withstanding the heat and corrosive effects of drilling mud as well as the salt water.

Risers are also used for the well completion and workover process. These risers can be separate risers or the needed functionality may be combined into a single "completion/workover riser". A completion riser is generally used to run the tubing hanger and tubing through the drilling riser and BOP. The workover riser is used in place of a drilling riser to re-enter the well through the subsea tree in open sea. This riser may also be used to install the subsea tree. A "completion/workover" riser will combine the needed functions of both. These risers are generally smaller diameter (5.25 in. ID) and assembled using ~45 ft joint lengths.

Production Risers (or Floating Production System Risers) are the fluid conduits between the subsea equipment and surface platform. The riser is the interface between the static structure on the ocean floor and the dynamic floating production system. As a result it must accommodate the accompanying dynamic loads in addition to its primary purpose of fluid and pressure containment. The diameter of a production riser can vary significantly depending on the type used, but in general could have an OD of 12 in. Production risers are fabricated by welding or threaded and coupled connections, depending on type.

After the produced fluids have been delivered to the floating production system (or topside), via the "production riser" separation of the oil from the oil, gas and water wellstream occurs, then the oil is transported from the topside to the subsea tubeline through an "export riser". The export riser is generally a welded steel tubular construction and laid in a simple catenary shape.

In one embodiment, tube and first and second flanged couplings are manufactured from a material having one or more of the following properties: a minimum yield strength of between about 50 and about 90 Ksi, more particularly, between about 68 and about 80 Ksi, and an ultimate tensile strength (UTS) of at least approximately 58 to 750 Ksi. In one embodiment of the present invention, but not necessarily, the material has a density of approximately one-third the density of steel.

In another embodiment, the auxiliary lines may include, but are not limited to, choke and kill tubes, hydraulic tubes, and booster tubes. Auxiliary lines are positioned outside tube, and function to provide hydraulic communication to a BOP and wellhead.

In another embodiment, a mechanical fitting is between one end of one tube and a flanged coupling. A mechanical fitting may also be used to join two generally cylindrical tube segments together. The mechanical fitting replaces the conventional process of welding the flange coupling to the tube. The mechanical fitting replaces the welding process that is problematic because the strength in the weld is always lower than the strength of the parent metal. Further, the corrosion resistance of the weld and/or the weld heat affected zones is often lower than that of the parent material.

In yet another embodiment, mechanical joints are used in the place of welded joints. Suitable mechanical joints include, but are not limited to, a threaded joint, bolted or other types of conventional mechanical joints. The advantage to a mechanical joint may include the ability of maintaining the properties of the parent metal in the joint (both strength and corrosion resistance). In another example, where multiple tube sections are required to make up a riser section, those tube sections could be joined by couplings. In yet another embodiment, a sealant is provided in the joint area.

In yet another embodiment, the riser section also includes a threaded insert, a bolt and a nose pin for securely coupling a string or series of riser sections together. Riser section further includes an auxiliary line socket, an auxiliary line lock nut, an auxiliary line box, an auxiliary line tube and an auxiliary line telescoping pin for securing each auxiliary line in a manner that will be appreciated by those skilled in the art. Telescoping pin effectively functions to provide a gap between the couplings of the riser sections to allow for stretching movement.

In a further embodiment, the aluminum drill riser system of the present invention comprises riser sections wherein the tube is composed of variable wall thicknesses along the length. For example, the tube may being thicker at the ends where the mechanical joints are located.

In one example, the tube sections are approximately 33 feet long with two tubes and two flanges making up a riser section (~75 ft., total). The method and apparatus of the present invention relates to an increase in wall thickness at the mechanical joint that reduces the total loss in load carrying capacity of the riser section. In one embodiment, the thickness is increased up to the ratio of the parent tube metal to mechanical joint zone strengths. For example, the thickness may be increased by at least 30% at the mechanical joint zone.

In another embodiment, tube thickness is either continuously varied or varied in a single step or multiple steps along the length of the tube. In another example, the length of the tube with greater wall thickness is varied (e.g. shorter results in a minimum weight design but the length should be longer than the weld zone, including heat affected zones for maximum efficiency). For a single step approach, the rate at which thickness is decreased is another variable (e.g. faster, rapidly). In one specific example of using a single step, a 1-3 foot length for the thick section with a 1-2 foot length where thickness is decreasing. In yet another embodiment, the O.D. and/or the I.D. is varied.

In yet another embodiment, numerous methods may be used to produce the taper. For example, the taper could be done by machining and/or metalworking operation that moves material rather than removing it.

The present invention may be employed for any material, any geometry and any manufacturing method for the riser application. In yet another embodiment, the material is an aluminum alloy. In yet another embodiment, the tube is an extruded tube with the extrusion process being used to create the geometry.

Suitable materials include, but are not limited to, grades like AA6063-T6, AA6061-T6, AA2219-T6 or AA2219-T8, AA2519-T8, AA7039-T6 and AA7005-T6 or friction stir weldable grades like AA7075-T6, AA7050-T76, AA7050-T74, AA7055-T77, AA7055-T76, AA7085-T6, AA7085-T76 or alloys with mixed weldability like AA2099-T8, AA2199-T8 or AA2195-T8.

Suitable materials also include, but are not limited to, 2XXX, 5XXX, 6XXX, 7XXX as per Aluminum Association and Russian equivalents of this families of alloys. In yet another embodiment, suitable material may also include, but are not limited to, Al—Li alloys for corrosion resistance.

FIG. 1 is one embodiment of the present invention illustrating a coupling of a Taper/Buttress/Breach Thread. The breach thread permits linear load with partial rotation to lock. The buttress thread is designed to carry high axial loads. Consequently, the riser tube and flange are threaded so that the riser tube is inserted into the flange and rotated to engage the threads.

Figure 2:
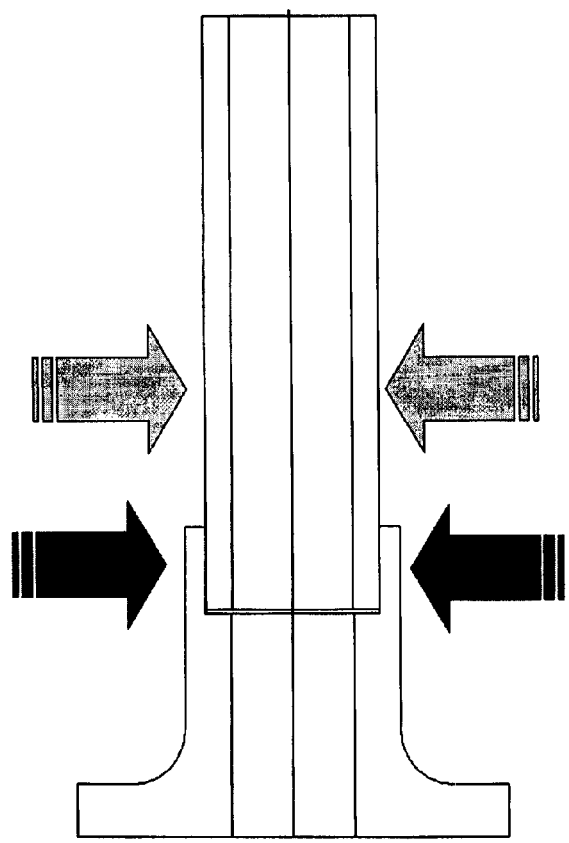
FIG. 2 is one embodiment of the present invention illustrating a coupling of a Heat Shrink Sleeve.

FIG. 2 is one embodiment of the present invention illustrating a coupling of a Heat Shrink Sleeve. The flange or thread is heated to expand over the riser tube and then cooled to create a compression joint. Other features can be incorporated into the component interface surfaces to improve mechanical interlock.

Figure 3:
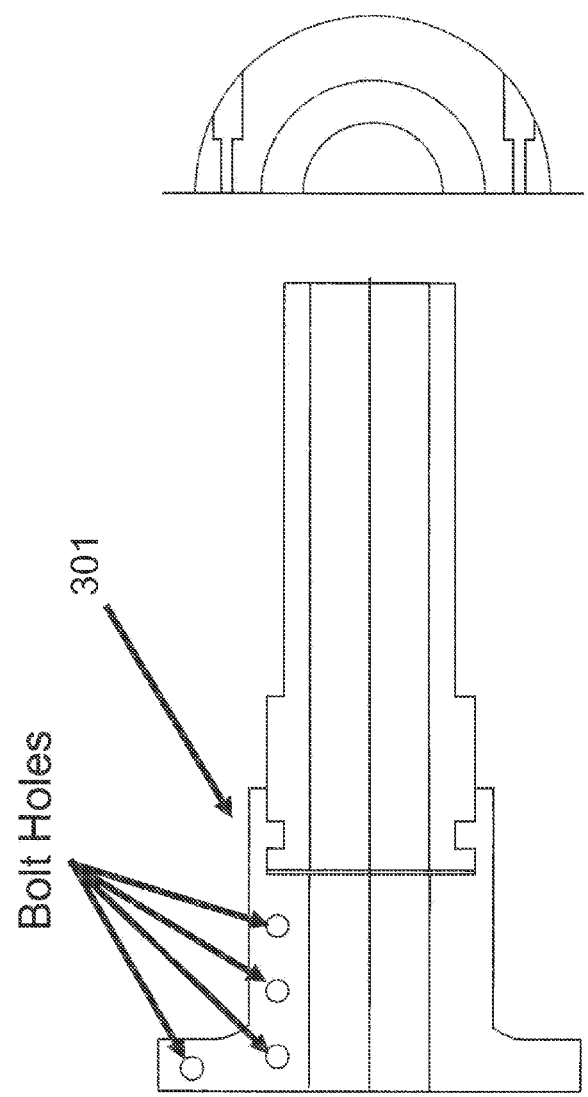
FIG. 3 is one embodiment of the present invention illustrating a coupling of a Split Collar.

FIG. 3 is one embodiment of the present invention illustrating a coupling of a Split Collar. The split collar includes features to improve the mechanical interlock designed into the flange or sleeve or tube. The flange (301) and sleeve are split. The attachment to the riser tube is accomplished through bolting of the flange (301) and the sleeve halves together and thus capturing the riser tube.

Figure 4:
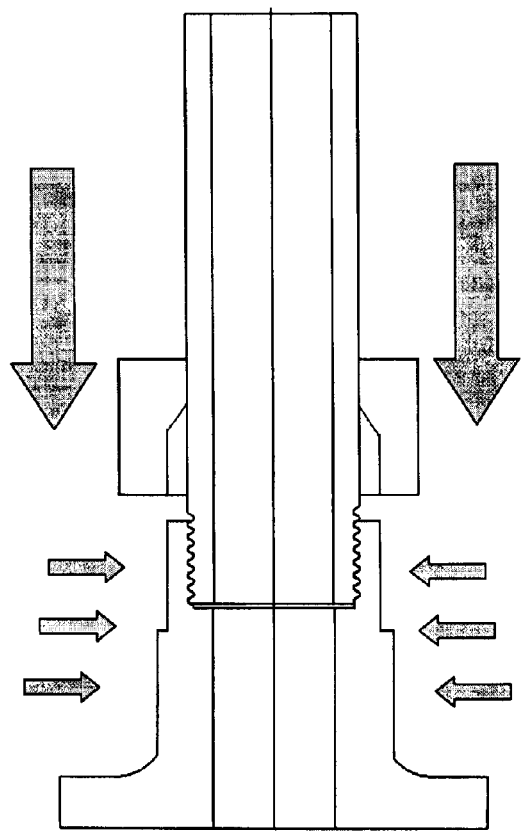
FIG. 4 is one embodiment of the present invention illustrating a coupling of a Forge Lock.

FIG. 4 is one embodiment of the present invention illustrating a coupling of a Forge Lock. A tool forges the flange or sleeve onto the riser tube.

Figure 5:
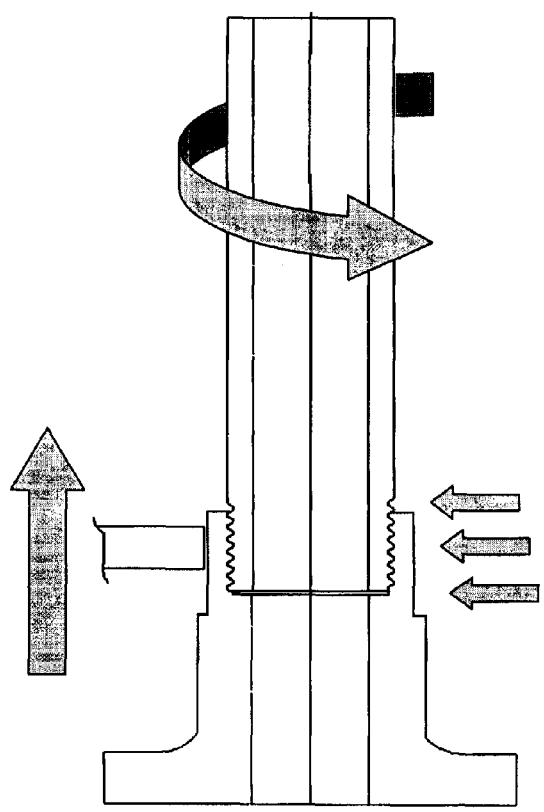
FIG. 5 is one embodiment of the present invention illustrating a coupling of a Spin Lock.

FIG. 5 is one embodiment of the present invention illustrating a coupling of a Spin Lock. A tool progressively forms a flange or sleeve onto the riser tube. The tool or assembly is rotated as the tool feeds the riser tube.

Figure 6:
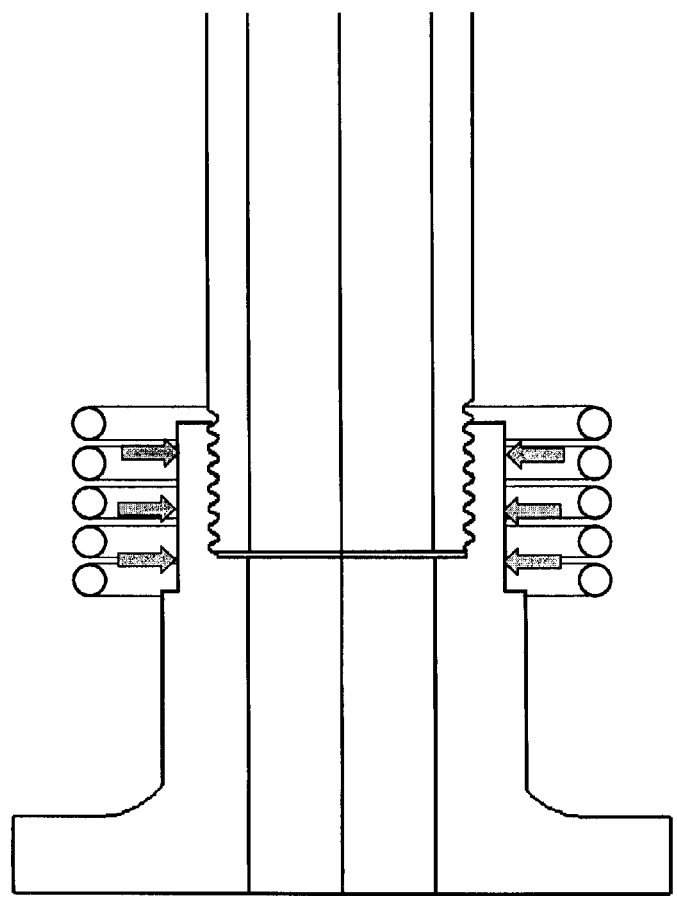
FIG. 6 is one embodiment of the present invention illustrating a coupling of a Magna-Form Lock.

FIG. 6 is one embodiment of the present invention illustrating a coupling of a Magna-Form Lock. A magnetic impulse load forges the flange or sleeve onto the riser tube.

Figure 7:
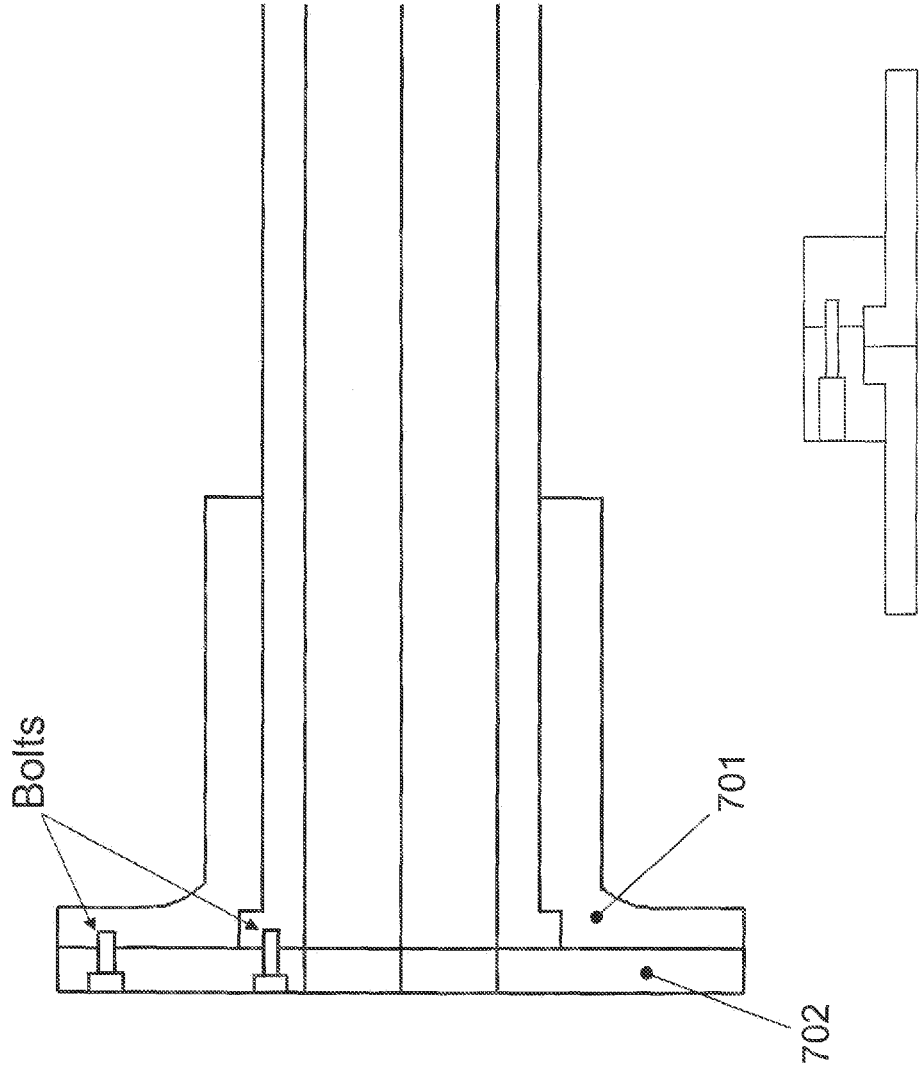
FIG. 7 is one embodiment of the present invention illustrating a coupling of a Flare & Lock.

FIG. 7 is one embodiment of the present invention illustrating a coupling of a Flare & Lock. An upset or flare in the riser tube is captured within the multi-piece flange (701 and 702) and bolted in place.

Figure 8:
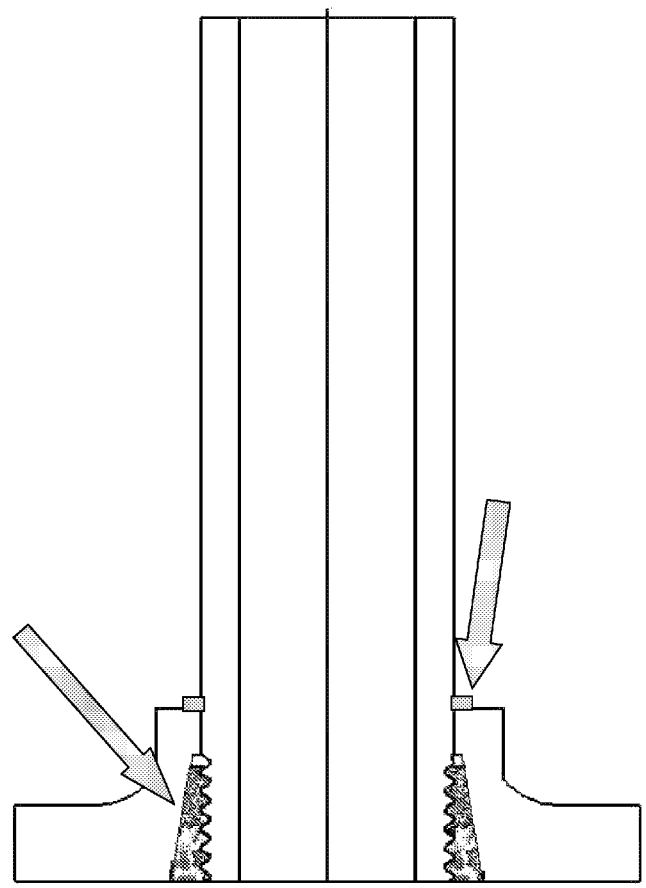
FIG. 8 is one embodiment of the present invention illustrating a coupling of a Split Key Lock.

FIG. 8 is one embodiment of the present invention illustrating a coupling of a Split Key Lock. The split key ring is wedged and locked by tension in the riser. A retaining ring or pin holds the collar in place when the riser is not in tension. In one embodiment, the flange Collar is loaded onto the riser tube past the key engagement. The split key ring is attached to the riser tube. The flange collar is moved back toward the riser tube end and wedges the key ring. The retainer ring or pin is installed to hold the flange collar in place.

Figure 9:
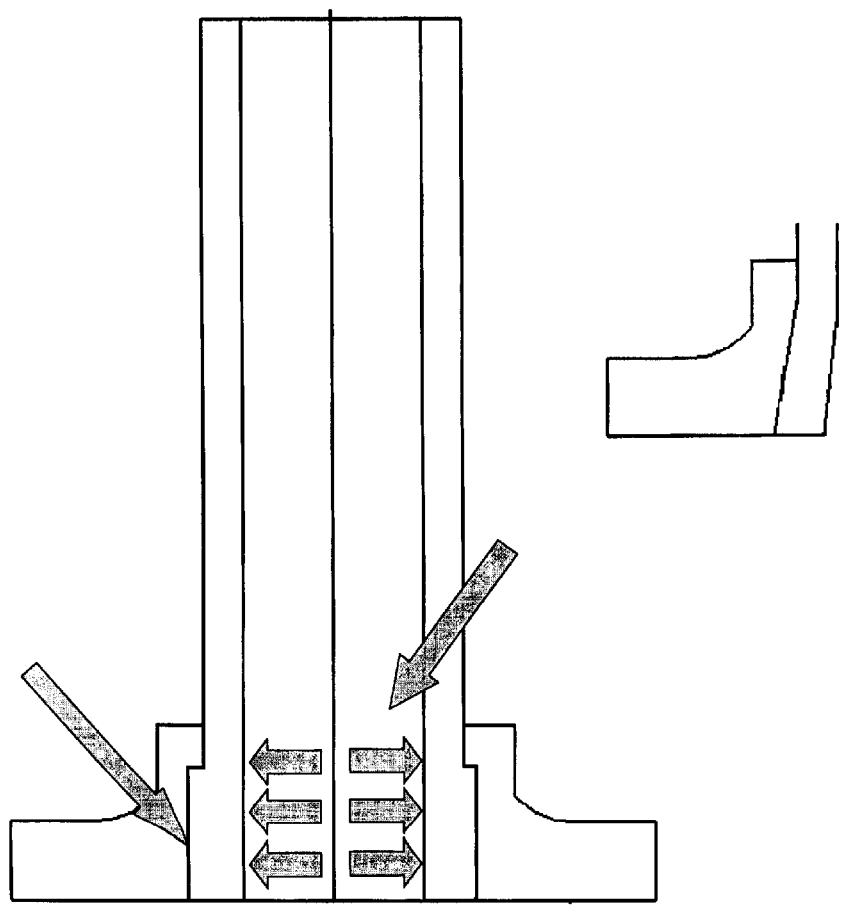
FIG. 9 is one embodiment of the present invention illustrating a coupling of a Hydro-Form Lock.

FIG. 9 is one embodiment of the present invention illustrating a coupling of a Hydro-Form Lock. A portion of the riser tube is expanded and locked into the flange. An internal pressure is applied to the controlled section of the riser tube. A variety of joint geometries and interfaces may be utilized.

Figure 10:
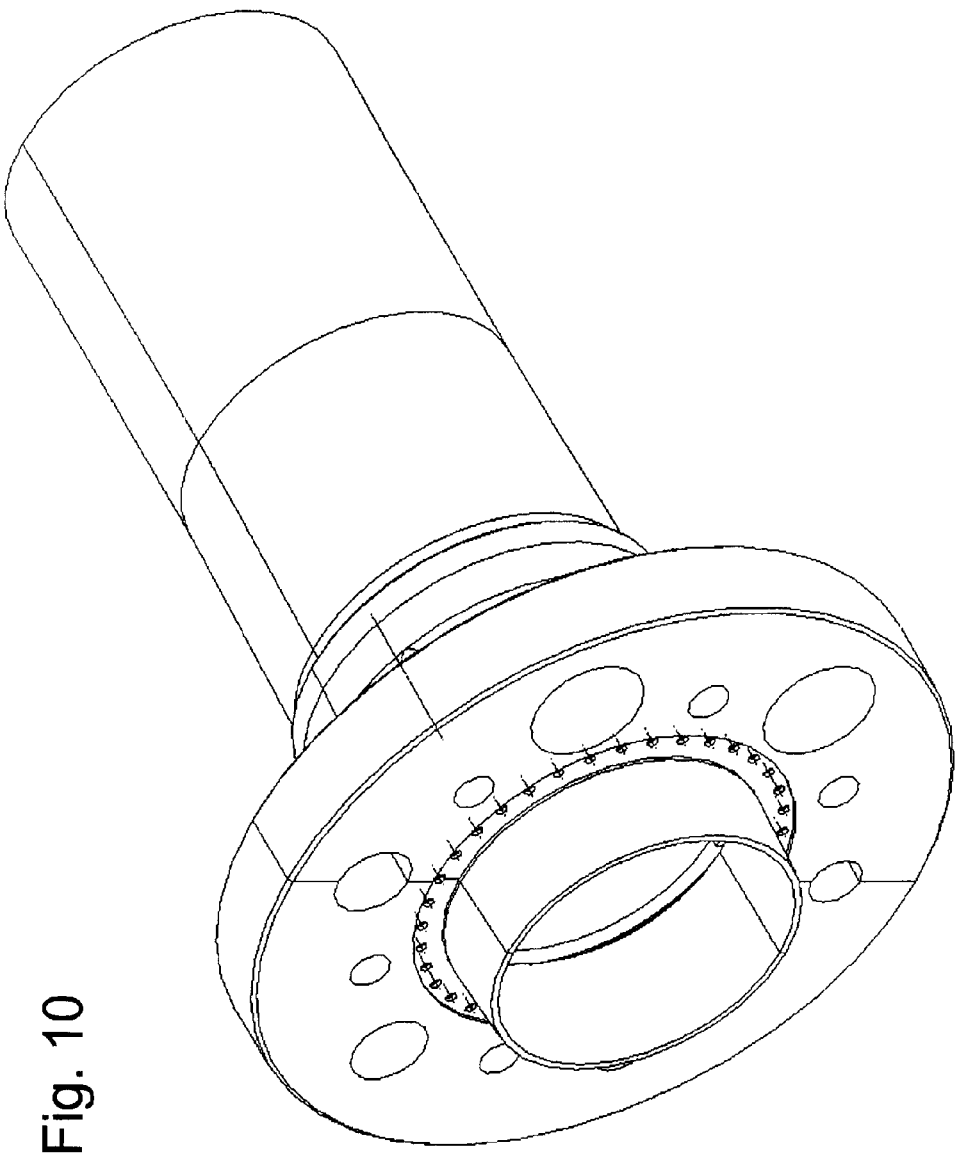
Figure 10A:
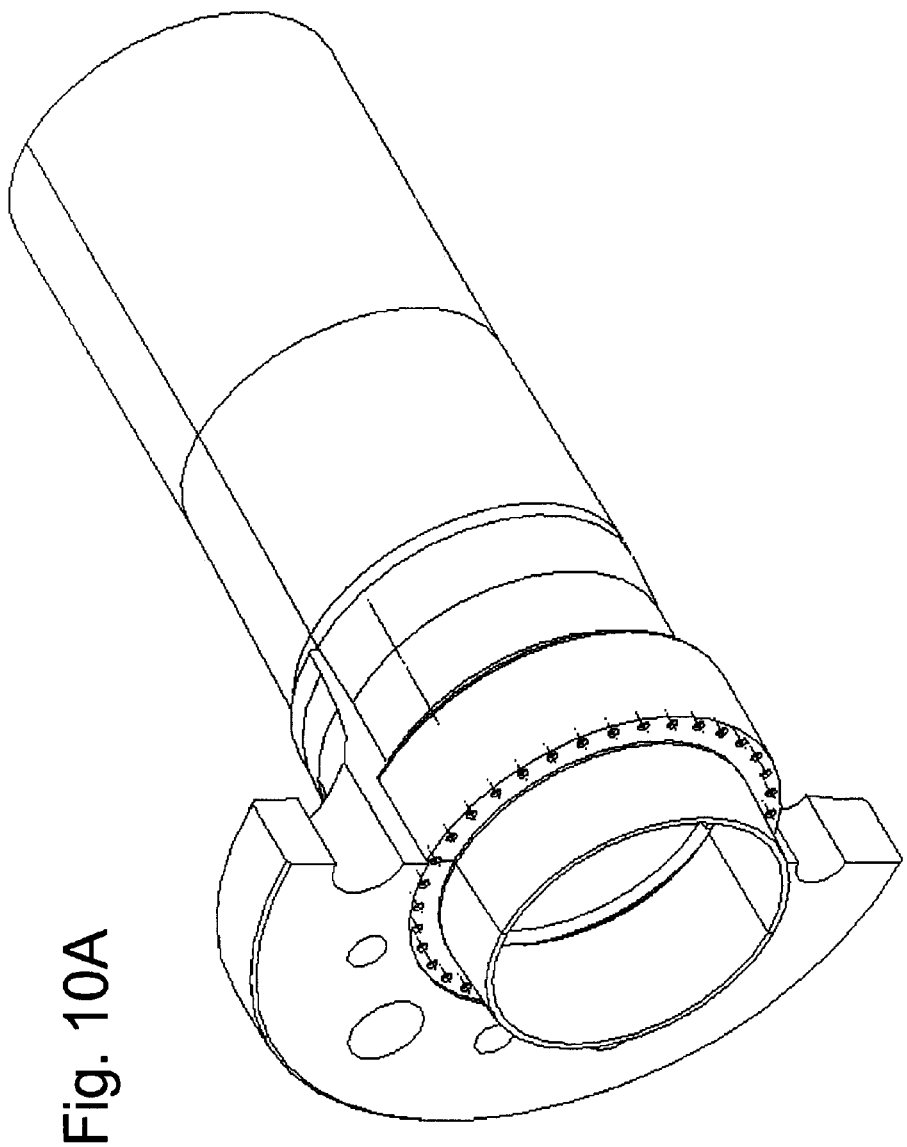
Figure 10B:
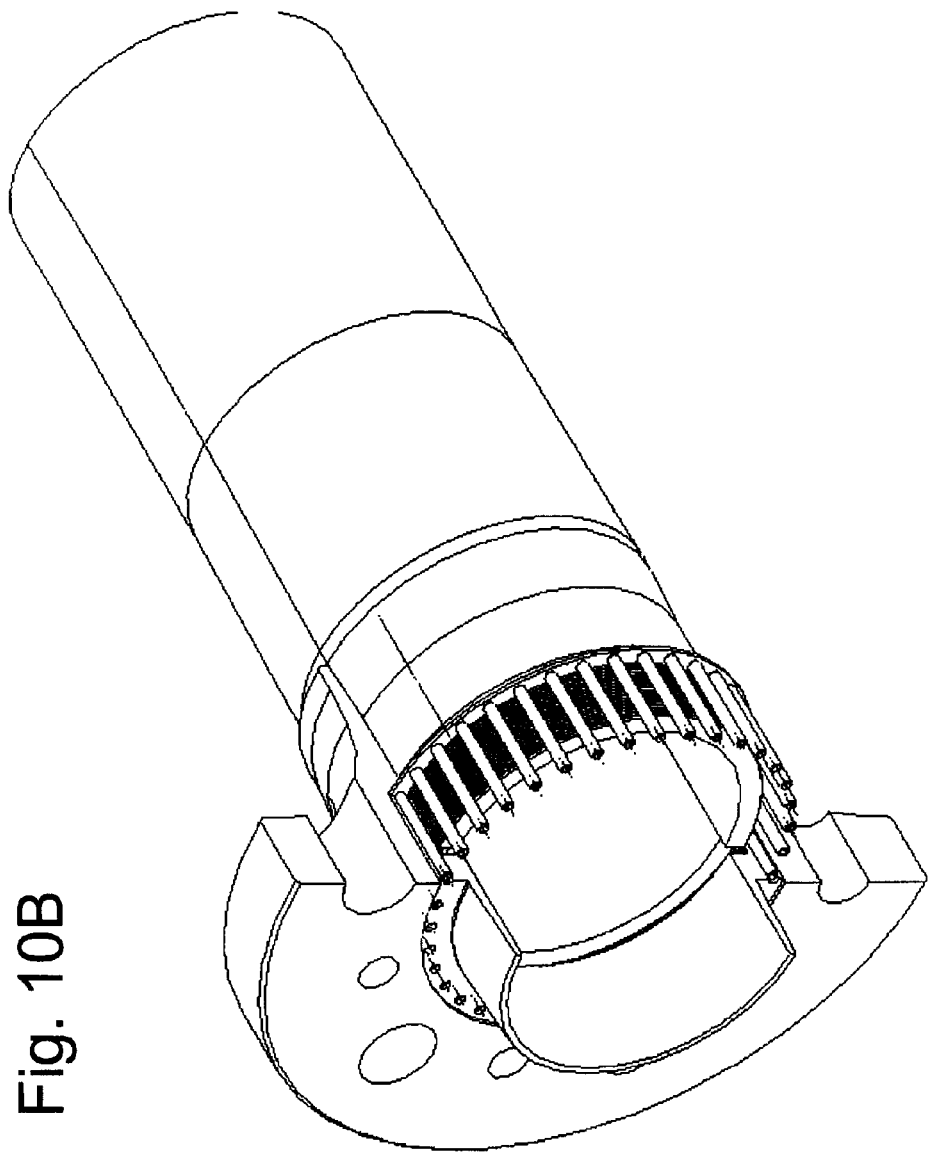

FIG. 10 is one embodiment of the present invention illustrating a coupling of a SuperNut type connection. FIG. 10A-C are additional illustrations of the embodiment. FIG. 12C illustrates nose pin threads on the tube. Tightening of the bolts "jack" the flange onto the tapered tube sections.

Figure 11:
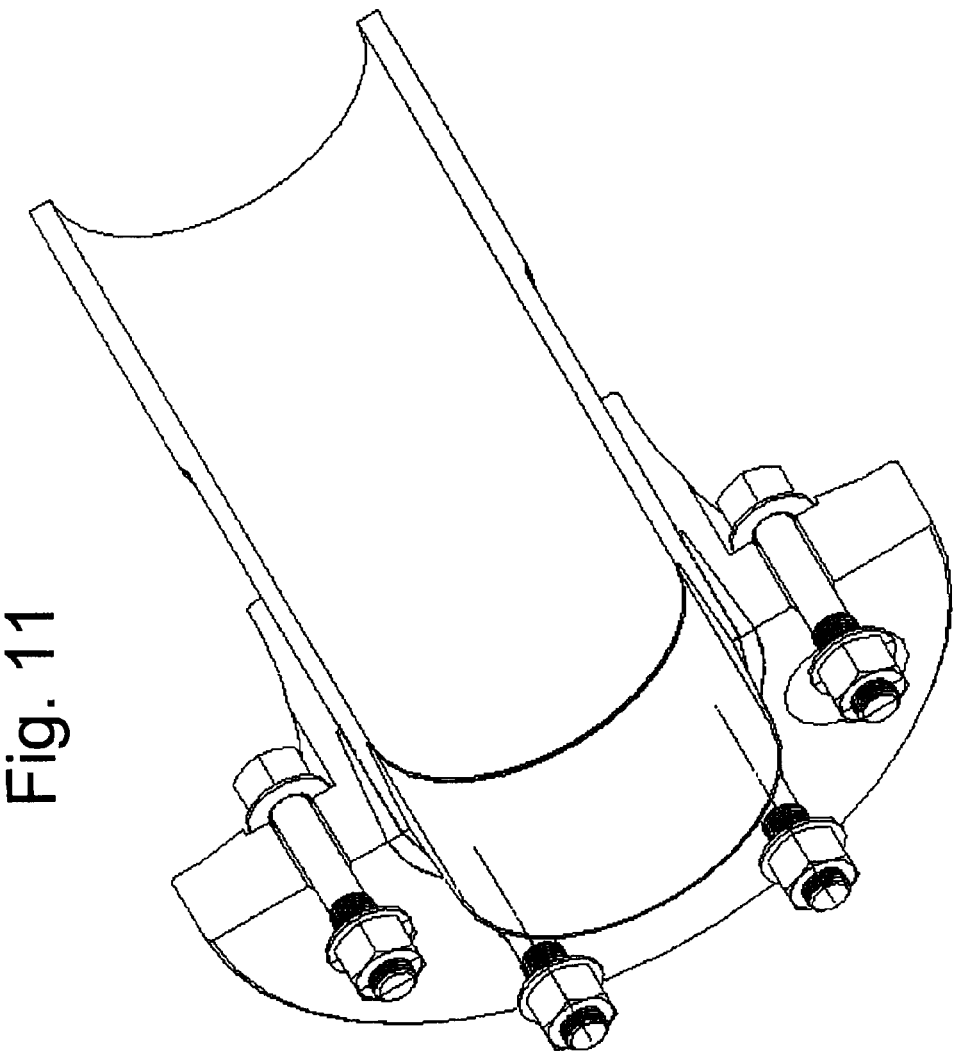
FIG. 11 is one embodiment of the present invention illustrating a coupling of a Swagelock type joint.

FIG. 11 is one embodiment of the present invention illustrating a coupling of a Swagelock type joint. A wedge creates a compressive hoop stress under the axial load.

Figure 12A:
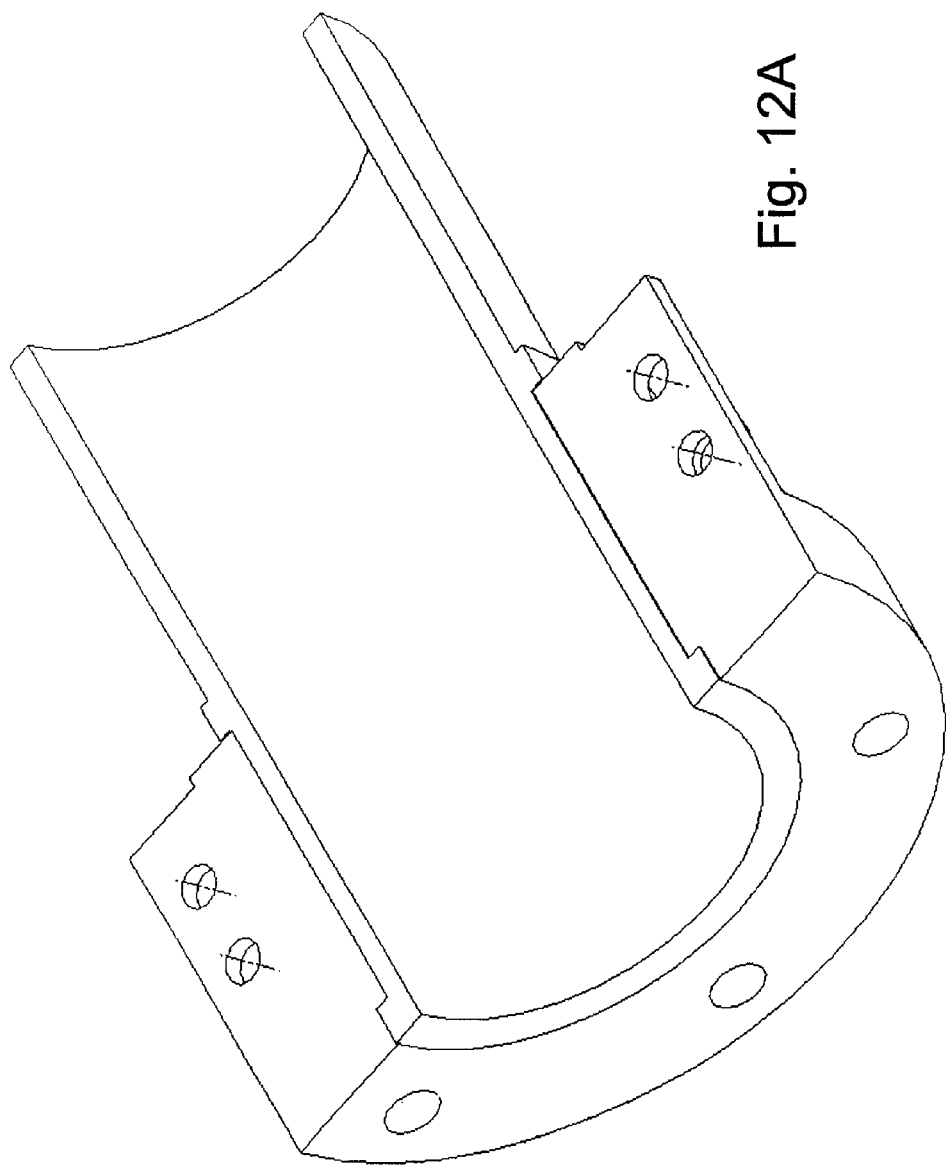

FIG. 12 is one embodiment of the present invention illustrating a coupling of a Split flange. FIG. 12A is an additional illustration.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is therefore intended that the appended claims encompass any such modifications or embodiments.

What is claimed is:

1. An offshore drilling riser apparatus for use in offshore drilling for oil or other fossil fuels, the offshore drilling riser apparatus comprising:
    a plurality of offshore metal drilling riser sections coupled serially end-to-end, wherein each of the offshore metal drilling riser sections, prior to being coupled to another offshore metal drilling riser section, comprises:
    an offshore metal drilling riser section tube having a first end and a second end;
    a first metal riser flange that is mechanically joined to the first end of the offshore metal drilling riser section tube, forming a first mechanical joining;
    a second metal riser flange that is mechanically joined to the second end of the offshore metal drilling riser section tube, forming a second mechanical joining; and
    wherein the offshore drilling riser apparatus is capable of withstanding dynamic loads exerted by an offshore drilling rig and a body of water in which the offshore drilling riser apparatus is suspended, based on:
        the offshore metal drilling riser section tube is consisting of at least one aluminum alloy selected from the group of: 2XXX alloys, 5XXX alloys, 6XXX alloys, 7XXX alloys and Al—Li alloys,
        the metal riser flanges are adapted to couple the plurality of offshore metal drilling riser sections serially end-to-end,
        the first and the second mechanical joinings are non-welded so that, in each respective mechanical joining, each respective metal riser flange is physically distinct from each respective end of the offshore metal drilling riser section tube to maintain a pre-joining physical integrity of such metal riser flange, and
        wherein the metal riser flanges, of the first and the second mechanical joinings respectively, are secured by threads over the offshore metal drilling riser section tube, wherein the threads are selected from the group consisting of: a taper, buttress, and breach thread.

2. The offshore drilling riser apparatus of claim 1, wherein the offshore metal drilling riser section tube further comprises: a first offshore metal drilling riser section tube part and a second offshore metal drilling riser section part, wherein the first offshore metal drilling riser section tube part is joined to the second offshore metal drilling riser section part by a third non-welded mechanical joining so as to result in the offshore metal drilling riser section tube.

3. A plurality of offshore metal drilling riser sections coupled serially end-to-end, wherein each of the offshore metal drilling riser sections, prior to being coupled to another offshore metal drilling riser section, comprises:
    an offshore metal drilling riser section tube having a first end and a second end;
    a first metal riser flange that is mechanically joined to the first end of the offshore metal drilling riser section tube, forming a first mechanical joining;
    a second metal riser flange that is mechanically joined to the second end of the offshore metal drilling riser section tube, forming a second mechanical joining;
    wherein the plurality of coupled offshore metal drilling riser sections is capable of withstanding dynamic loads exerted by an offshore drilling rig and a body of water in which the plurality of coupled offshore metal drilling riser sections are suspended, based on:
        the offshore metal drilling riser section tube is consisting of at least one aluminum alloy selected from group of: 2XXX alloys, 5XXX alloys, 6XXX alloys, 7XXX alloys and Al—Li alloys,
        the metal riser flanges are adapted to couple the plurality of offshore metal drilling riser sections serially end-to-end,
        the first and the second mechanical joinings are non-welded so that, in each respective mechanical joining, each respective metal riser flange is physically distinct from each respective end of the offshore metal drilling riser section tube to maintain a pre-joining physical integrity of such metal riser flange, and
        wherein the metal riser flanges, of the first and the second mechanical joinings respectively, are secured by threads over the offshore metal drilling riser section tube, wherein the threads are selected from the group consisting of: a taper, buttress, and breach thread.

4. The plurality of offshore metal drilling riser sections of claim 3 wherein the first end of the offshore metal drilling riser section tube is mechanically joined to the first metal riser flange by a heat shrink sleeve.

5. The plurality of offshore metal drilling riser sections of claim 3 wherein the first end of the offshore metal drilling riser section tube is mechanically joined to the first metal riser flange by a split collar.

6. The plurality of offshore metal drilling riser sections of claim 3 wherein the first end of the offshore metal drilling riser section tube is mechanically joined to the first metal riser flange by a forge lock.

7. The plurality of offshore metal drilling riser sections of claim 3 wherein the first end of the drilling riser section tube is mechanically joined to the first riser flange by a spin lock.

8. The plurality of metal drilling riser sections of claim 3 wherein the first end of the offshore metal drilling riser section tube is mechanically joined to the first metal riser flange by a magna-form lock.

9. The plurality of offshore metal drilling riser sections of claim 3 wherein the first end of the offshore metal drilling riser section tube is mechanically joined to the first metal riser flange by a flare & lock.

10. The plurality of offshore metal drilling riser sections of claim 3 wherein the first end of the offshore metal drilling riser section tube is mechanically joined to the first metal riser flange by a split key lock.

11. The plurality of offshore metal drilling riser sections of claim 3 wherein the first end of the offshore metal drilling riser section tube is mechanically joined to the first metal riser flange by a hydro-form lock.

12. The plurality of offshore metal drilling riser sections of claim 3 wherein the first end of the offshore metal drilling riser section tube is mechanically joined to the first metal riser flange by a supernut connection.

13. The plurality of offshore metal drilling riser sections of claim 3 wherein the first end of the offshore metal drilling riser section tube is mechanically joined to the first metal riser flange by a swagelock joint.

14. The plurality of offshore metal drilling riser sections of claim 3 wherein the first end of the offshore metal drilling riser section tube is mechanically joined to the first metal riser flange by a split flange.

15. The plurality of offshore metal drilling riser sections of claim 3 wherein the offshore metal drilling riser section tube is composed of variable wall thicknesses along the length so that the offshore metal drilling riser section tube is thicker at the ends where the mechanical joints are located.

16. The plurality of offshore metal drilling riser sections of claim 3, wherein the mechanical joinings between the offshore metal drilling riser section tube and the metal riser flanges are designed so as to result in allowing the plurality of coupled offshore metal drilling riser sections to extend a length of at least approximately 1,500 meters or greater.

17. The plurality of offshore metal drilling riser sections of claim 3, wherein the offshore metal drilling riser section tube further comprises: a first offshore metal drilling riser section tube part and a second offshore metal drilling riser section part, wherein the first offshore metal drilling riser section tube part is joined to the second offshore metal drilling riser section part by a third non-welded mechanical joining so as to result in the offshore metal drilling riser section tube.

18. An offshore metal drilling riser, comprising:
an offshore metal drilling riser section tube having a first end and a second end;
a first metal riser flange that is mechanically joined to the first end of the offshore metal drilling riser section tube, forming the first mechanical joining:
a second metal riser flange that is mechanically joined to the second end of the offshore metal drilling riser section tube, forming the second mechanical joining;
wherein the offshore metal drilling riser is capable of withstanding dynamic loads exerted by an offshore drilling rig and a body of water in which the offshore metal drilling riser is suspended, based on:
the offshore metal drilling riser is consisting of at least one aluminum alloy selected from the group of: 2XXX alloys, 5XXX alloys, 6XXX alloys, 7XXX alloys and Al—Li alloys,
the metal riser flanges are adapted to coupling a plurality of offshore metal drilling risers serially end-to-end,
wherein the first and the second mechanical joinings are non-welded so that, in each respective mechanical joining, each respective metal riser flange is physically distinct from each respective end of the offshore metal drilling riser section tube to maintain a pre-joining physical integrity of such metal riser flange, and
wherein the metal riser flanges, of the first and the second mechanical joinings respectively, are secured by threads over the offshore metal drilling riser section tube, wherein the threads are selected from the group consisting of: a taper, buttress, and breach thread.

19. The offshore metal drilling riser of claim 18, wherein the offshore metal drilling riser section tube further comprises: a first offshore metal drilling riser section tube part and a second offshore metal drilling riser section part, wherein the first drilling offshore metal riser section tube part is joined to the second offshore metal drilling riser section part by a third non-welded mechanical joining so as to result in the offshore metal drilling riser section tube.

\* \* \* \* \*